US005250180A

United States Patent [19]

Chang

[11] Patent Number: 5,250,180

[45] Date of Patent: Oct. 5, 1993

[54] OIL RECOVERING APPARATUS FROM USED LUBRICANT

[75] Inventor: Yun-Te Chang, Tainan Hsien, Taiwan

[73] Assignee: FWU Kuang Enterprises Co., Ltd., Tainan Hsien, Taiwan

[21] Appl. No.: 974,083

[22] Filed: Nov. 10, 1992

[51] Int. Cl.[5] .......... B01D 17/038

[52] U.S. Cl. .......... 210/375; 210/372; 210/374; 210/396; 494/42; 494/56

[58] Field of Search .......... 210/107, 147, 360.1, 210/369, 372, 374, 512.1, 375, 396; 494/42, 56

[56] References Cited

U.S. PATENT DOCUMENTS 3,256,994 6/1966 Koelsch .......... 210/374
4,416,655 11/1983 Bennett .......... 494/52
4,997,575 3/1991 Hultsch .......... 210/346

*Primary Examiner*—Robert A. Dawson
*Assistant Examiner*—David Reifsnyder
*Attorney, Agent, or Firm*—Christie, Parker & Hale

[57] ABSTRACT

An apparatus for recovering oil from used lubricant includes a centrifugal separation unit having a centrifugal tank for receiving and separating used lubricant and a scraping unit having blades provided in the tank for scraping contaminant from the inner side of the wall of the tank. A synchronizing mechanism is provided for simultaneously rotating the tank and the blades at different rates to cause the blades to scrape the contaminant.

5 Claims, 7 Drawing Sheets

OIL RECOVERING APPARATUS FROM USED LUBRICANT

BACKGROUND OF THE INVENTION

1. Field of the Invention

The present invention relates to an oil recovering apparatus utilizing used lubricant from machines, more particularly to an oil recovering apparatus which uses a synchronizing mechanism to drive the scraping blades and the tank simultaneously at different rates, thereby enabling the scraping blades to scrape the contaminant from the inner wall of the tank and thus obtain an economical high degree of removal of contaminants.

2. Description of the Prior Art

In order to ensure smooth operation of a machine in a factory, it is often necessary to add lubricant or cooling oil to the machine as the machine is performing. For example, the manufacture of bolts or rivets involves a process of plastic deformation by means of high speed pressing requiring the addition of a large quantity of lubricant or cooling oil to operate the machine. However, since the quantity of oil added is extremely large and the used oil usually contains a large amount of contaminants, it causes pollution to the environment as well as increasing the costs of manufacture if the used oil is discarded. For environmental consideration and for the sake of cost-saving, an oil recovering apparatus is employed to separate the contaminant from the used oil or lubricant and recycle the oil or lubricant.

A conventional oil recovering apparatus is shown in FIG. 1, which is composed of a driving unit (1), a retaining means (2) and an oil-purifying mechanism (3). The oil-purifying mechanism (3) comprises a tank (17) for receiving used lubricant. An oil inlet (35) is provided at the bottom of the tank (17). A shaft seat (15) and a stopping member (16) are mounted together by a bolt (152) and then are sealed at the top of the tank (17) by bolts (162) which securely fix the stopping member (16) and the tank (17) so that the shaft seat (15), the stopping member (16) and the tank (17) become an integral part and can be rotated or stopped together. An oil outlet (151) is provided near the edge of the shaft seat (15). For accumulation of the purified oil or lubricant, the oil outlet (151) is further linked to a chamber (R) located around outside of the tank (17). An oil exit tube (R1) further connects the chamber (R) to the machine (not shown) for recycling or reuse of the purified oil or lubricant.

The driving unit (1) is used to rotate the tank (17) to separate of the contaminant and the used oil using centrifugal force, which includes a first hollow shaft (13) secured to the shaft seat (15) on the tank (17). The driving unit (1) also includes an motor (M) and two belt wheels (11, 12) which are interconnected by a looped belt. The belt wheel (11) is mounted to the turning shaft of the motor (M) and can be driven thereby. The belt wheel (12) is mounted to the first hollow shaft (13) mentioned above and can pass the power of the motor (M) to drive the first shaft (13) and thus to rotate the tank (17).

The oil-purifying mechanism (3) further comprises a second shaft (14) extends axially through and is mounted to the hollow shaft (13) for relative rotation therebetween. The second shaft (14) extends into the tank (17) and is provided with a plurality of scraping blades (32), via a base plate (31) mounted at the bottom of the second shaft (14), for scraping the contaminant which then is separated from the oil by centrifugal force and deposited on the inner peripheral wall of the tank (17).

The retaining means (2) are fixed above the aforementioned stopping member (16), which includes a stopping rod (23) inserting into a spring member (22), both of which are enclosed in a bore (211) and a space (212) formed by cylindrical casing (21). Also, the stopping member (16) has a receiving port (161) corresponding to the stopping rod (23) for the insertion of the stopping rod (23) into the receiving port (161) to retain or fix the tank (17).

When this conventional oil recovering apparatus is performing, the stop rod (23) is first lifted from the receiving port (161) so that the motor (M) could drive the shaft (13) to rotate the shaft seat (15), the stopping member (16) and the tank (17) as a whole. The used oil enters the tank (17) from the oil inlet (35) at the bottom of the tank (17) and is subjected to a centrifugal force generated by the rotation of the tank (17). Because the mass of the contaminant is larger than the oil, the matter of the contaminant is easier to deposit on the inner peripheral wall of the tank (17) and thus is separated from the oil. Afterwards, the purified oil leaves the tank (17) through the oil outlet (151) and accumulates in the chamber (R) flowing out through the exit tube (R1).

It is apparent that the sludge of contaminant deposited on the inner wall must be removed. Referring to FIG. 2, the stop rod (23) of the retaining means (2) is moved downward into the receiving port (161) to arrest the tank (17). Thereafter, the cap (14A) of the second shaft (14) is rotated manually, thus rotating the blades (32) and scraping the contaminant from the inner wall of the tank (17).

The removal process of contaminant described above is in fact not practical and not ideal. The reason is that the sludge of contaminant is generated in such a large amount and such a high rate that the contaminant removal process must generally be performed every hour or every thirty minutes in a factory. The scraping of the contaminant is carried out manually, thus if someone forgets to run the scraping blades and remove the contaminant, it may form a heavy, thick and viscous layer of sludge on the wall of the tank (17). Therefore, the rotation of the shaft (14) driven by manual labor needs huge efforts. It is also possible that the shaft (14) becomes unrotatable if the contaminant removal process is not carried out for a long time. In such a case, the tank (17) and the relevant elements in the oil recovering apparatus must be taken apart so that the accumulated sludge on the inner wall of the tank (17) can be removed.

SUMMARY OF THE INVENTION

Accordingly, the main object of the present invention is to provide an improved oil recovery apparatus which, instead of using manual labor to remove the contaminant sludge, employs a synchronizing mechanism to drive the scraping blades and the tank simultaneously at different rates, thereby enabling the scraping blades to scrape the contaminant from the inner wall of the tank thus obtaining labor saving high performance removal of contaminant.

The oil recovery apparatus utilizing used lubricant in the present invention comprises:

a centrifuge unit including a tank for receiving the used lubricant, a hollow shaft connected to the tank and having an upper portion extending outwardly from the top of the tank, and a motor operatively connected to the hollow shaft so as to drive the hollow shaft to rotate the tank; the tank having an inner peripheral wall for deposition of the contaminant from the used oil by centrifugal force;

means for scraping the contaminant from the inner peripheral wall of the tank including a second shaft which extends axially through and is mounted to the hollow shaft for relative rotation therebetween;

the second shaft having a lower portion extending downwardly out of the hollow shaft into the tank and having an upper portion extending upwardly out of the hollow shaft;

the contaminant-scraping means further including a plurality of scraping blades extending radially outward from the lower portion of the second shaft for scraping contaminant from the inner peripheral wall of the tank; and a synchronizing mechanism, connected to the centrifuge unit and the contaminant-scraping means to drive the hollow shaft and the second shaft simultaneously at different rates, which comprises:

a first gear attached to the upper portion of the second shaft;

a second gear attached to the upper portion of the hollow shaft; the first gear and the second gear having a different number of teeth;

a synchronizing shaft provided adjacent to the first and second gears;

a third gear and a fourth gear mounted on the synchronizing shaft in an axially movable position, wherein the third and fourth gears have different numbers of teeth and are spaced at a distance equal to that between the first gear and the second gear; the synchronizing shaft being fixedly placed at a position where the first gear with the third gear and the second gear with the fourth gear can be engaged respectively;

means for moving axially the third gear and the fourth gear together along the synchronizing shaft to engage or disengage from the first gear and the second gear respectively; and a driving unit operatively connected to the third fourth gears to rotate the first and second gears via the third and the fourth gears.

BRIEF DESCRIPTION OF THE DRAWINGS

The oil recovering apparatus according to the present invention will be more particularly described with reference to the accompanying drawings, and related objects may appear as the description of the invention proceeds.

DETAILED DESCRIPTION OF THE PREFERRED EMBODIMENT

Figure 1:
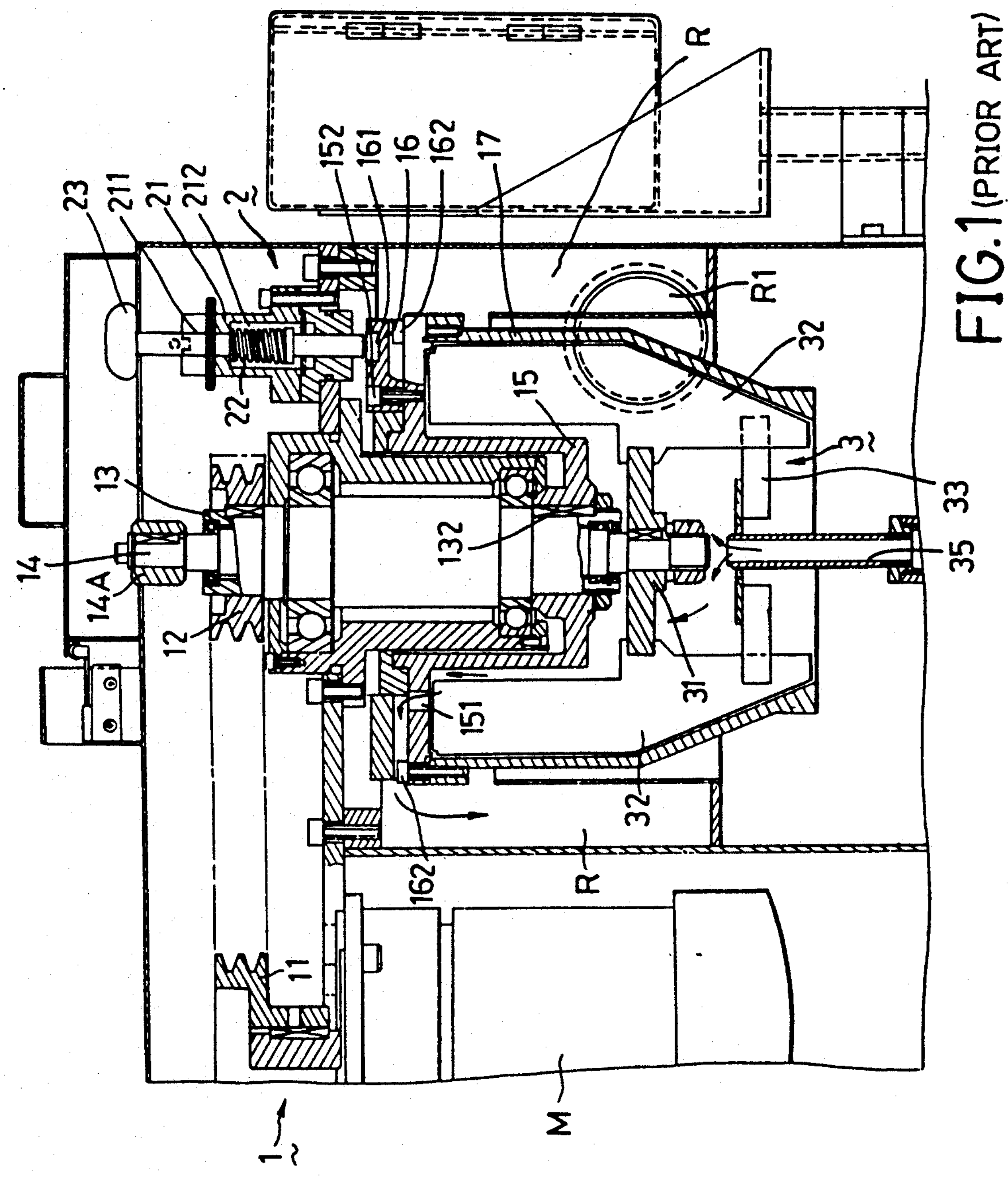
FIG.1 (PRIOR ART)
FIG. 1 is the fragmentary sectional side view of a conventional oil recovering apparatus.
Figure 2:
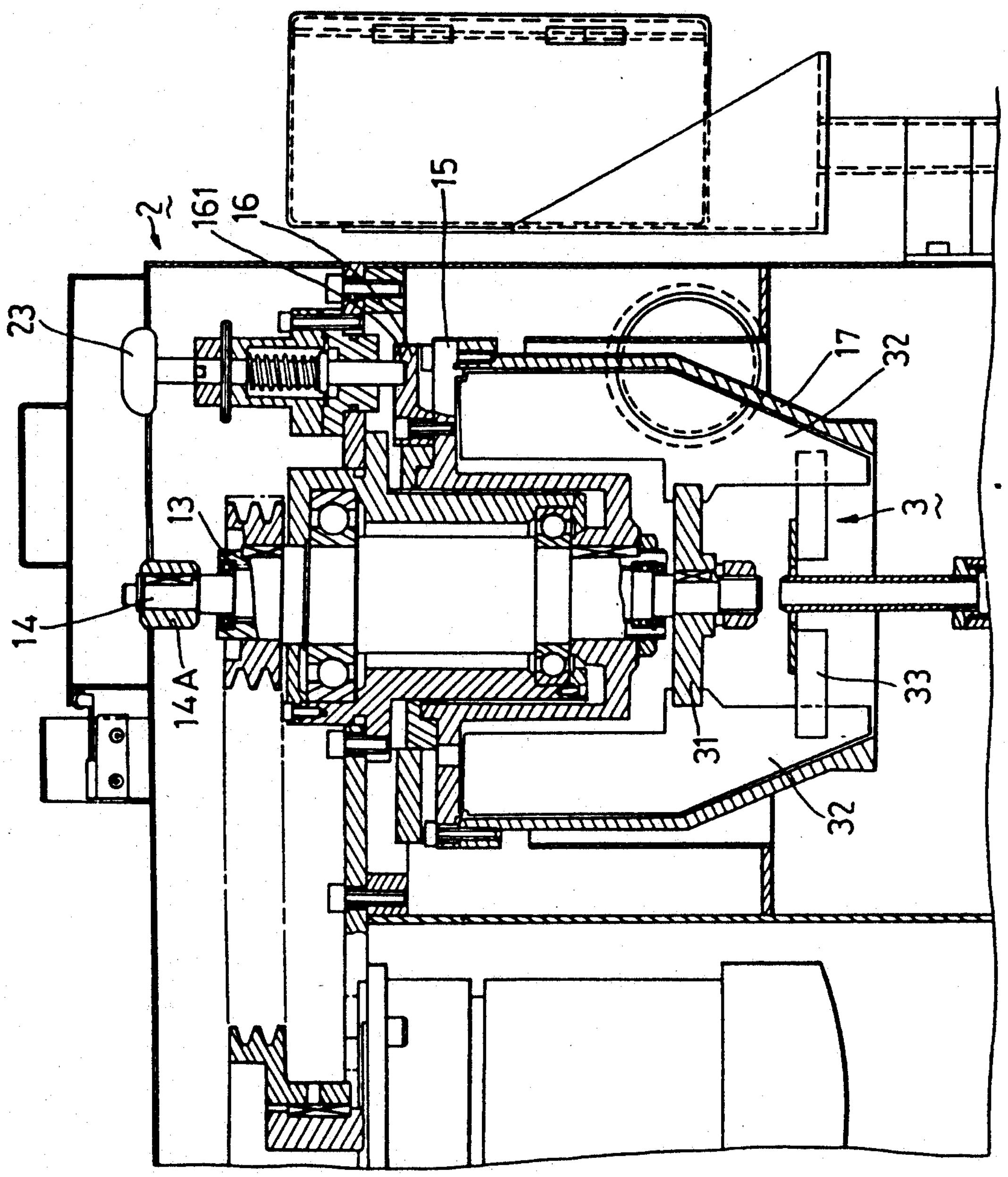
FIG. 2 (PRIOR ART)
FIG. 2 shows the conventional oil recovering apparatus of FIG. 1 when the contaminant removal process is proceeding.
Figure 3:
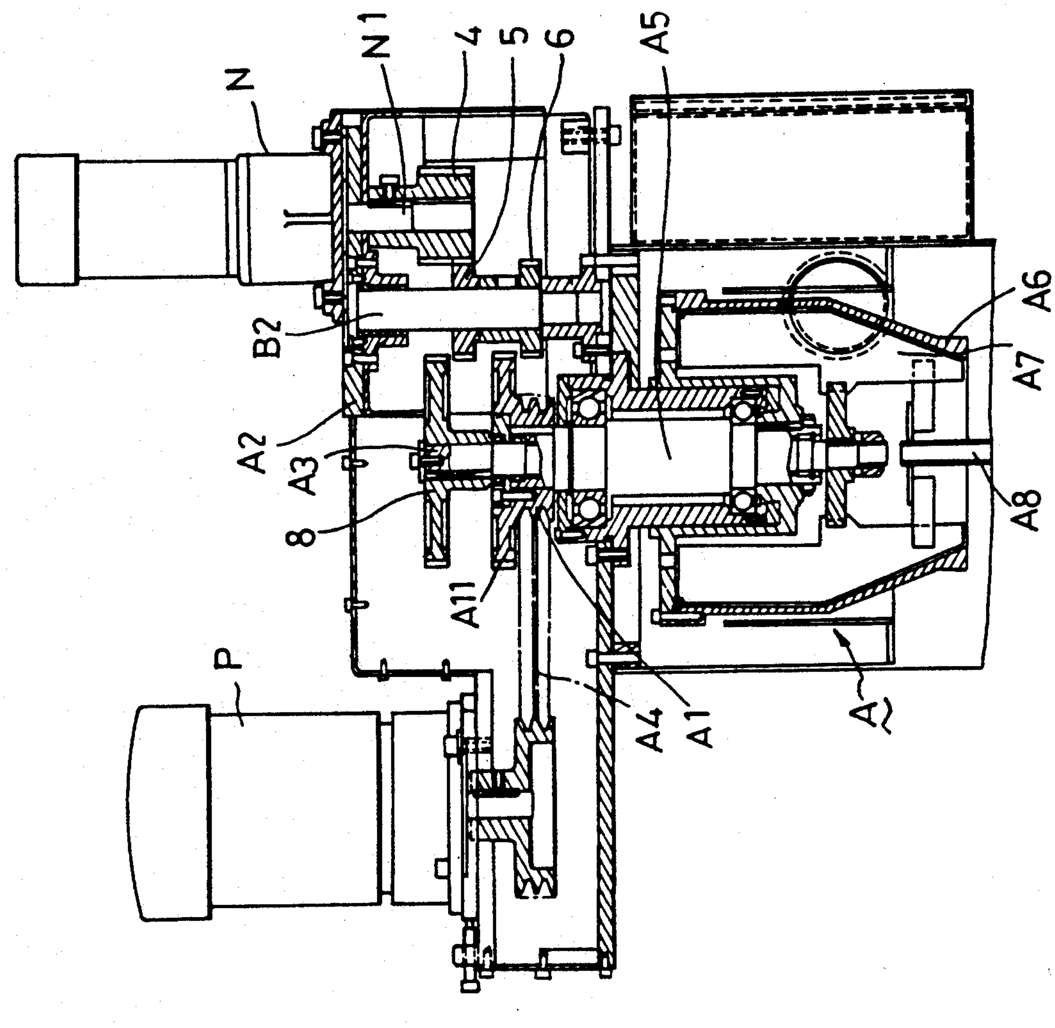
FIG. 3 is a sectional side view of a preferred embodiment of an oil recovering apparatus according to the present invention.

Referring to FIG. 3, according to the present invention, a preferred embodiment of an apparatus for recovering oil from used lubricant from a machine comprises a centrifuge unit (A) which includes a tank (A6) for receiving used lubricant. The used lubricant can enter the tank (A6) through the oil inlet (A8) which is provided at the bottom of the tank (A6). The centrifuge unit also comprises a hollow shaft (A5) connected to the tank (A6) and having an upper portion extending outwardly from the top of the tank (A6). A belt wheel (A1) is provided at the upper portion of the hollow shaft (A5) for being interconnected, by means of a looped belt (A4), with another belt wheel mounted at the turning shaft of a motor (P) to drive the hollow shaft (A5) and thus to rotate the tank (A6). Furthermore, the hollow shaft (A5) is provided with a gear (A11) above the belt wheel (A1). As can be seen from FIG. 3, the gear (A11) and the belt wheel (A1) may be integrally shaped and fixedly mounted to the hollow shaft (A5). A full description of the function of the gear (A11) will be given hereinafter.

The preferred embodiment of the present invention also includes a contaminant-scraping means which includes a second shaft (A3) which extends axially through and is mounted to said hollow shaft (A5) for relative rotation therebetween. The second shaft (A5) has a lower portion extending downwardly out of the hollow shaft (A5) into the tank (A6) and has an upper portion extending upwardly out of the hollow shaft (A5). A plurality of scraping blades (A7) extends radially outward from the lower portion of the second shaft (A3) for scraping the contaminant from the inner peripheral wall of the tank (A6).

According to the present invention, a synchronizing mechanism is designed to be connected to the centrifuge unit (A) and the contaminant-scraping means for driving the hollow shaft and the second shaft simultaneously at different rates. The synchronizing mechanism comprises a first gear (8) attached to the upper portion of the second shaft (A3). The synchronizing mechanism also includes a second gear (A11) which, as referred to hereinbefore, is attached to the upper portion of the hollow shaft (A5) at above the belt wheel (A1) and may be integrally shaped therewith. The first gear (8) and the second gear (A11) are designed to have the same diameter but different numbers of teeth. In this preferred embodiment, the first gear (8) is provided with 80 teeth and the second gear (A11) with 81 teeth for example.

In order to drive the hollow shaft (A5) and the second shaft (A3) turning at different rates, a synchronizing shaft (B2) is provided in part (A2) of the machine body adjacent to the first gear (8) of the second shaft (A3) and the second gear (A11) of the hollow shaft (A5). A third gear (5) and a fourth gear (6) are mounted on the synchronizing shaft (B2) in an axially movable position. The synchronizing shaft (B2) is fixed in a position where the first gear (8) and the second gear (A11)

can get engagement with the third (5) and fourth (6) gears respectively.

Figure 4:
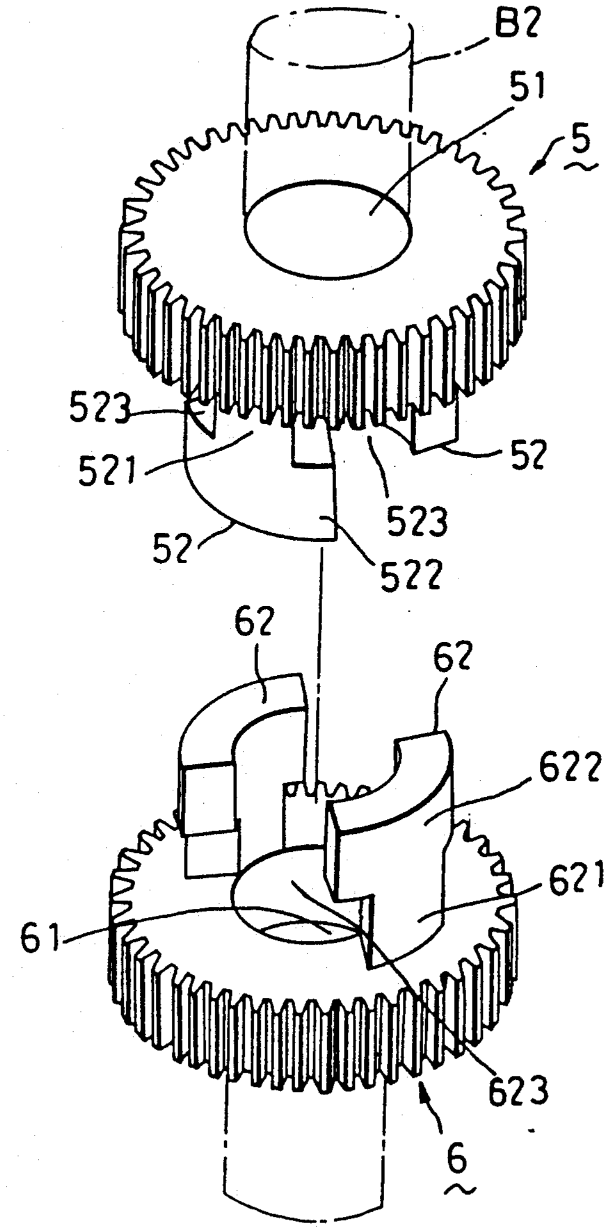
FIG. 4 shows an exploded perspective view of a third and a fourth gears used in the preferred embodiment.

Since the third gear (5) and the fourth gear (6) are used to engage the first (8) and second gear (A11) respectively to drive the second shaft (A3) and the hollow shaft (A5) at different rates, the third and fourth gears (5, 6) are also designed to have the same diameter but different numbers of teeth. In this preferred embodiment, the third gear (5) has 41 teeth and the fourth gear (6) and 40 teeth for example. Moreover, the third and fourth gears (5, 6) are spaced at a constant distance equal to that between the first gear (8) and the second gear (A11). Particularly, the two gears (5, 6) are assembled as shown in FIG. 4. Each of the third gear (5) and the fourth gear (6) has a bore (51, 61) for receiving the synchronizing shaft (B2) and has at one side thereof a pair of diametrically opposite engaging members (52, 62) extending axially therefrom. Each of the engaging members (52, 62) is generally in the shape of a segment of a cylinder and has a neck part (521, 621) and an enlarged end (522, 622) extending axially outward from the neck part (521, 621). The third gear (5) and the fourth gear (6) are interengaged by fitting the enlarged ends (522) of the engaging members (52) of the third gear (5) into the space (623) between the neck parts (621) of the engaging member (62) of the fourth gear (6) and vice versa. As a result, the engaging members (52, 62) of the third and fourth gears (5, 6) complement each other to form a cylinder.

Figure 5:
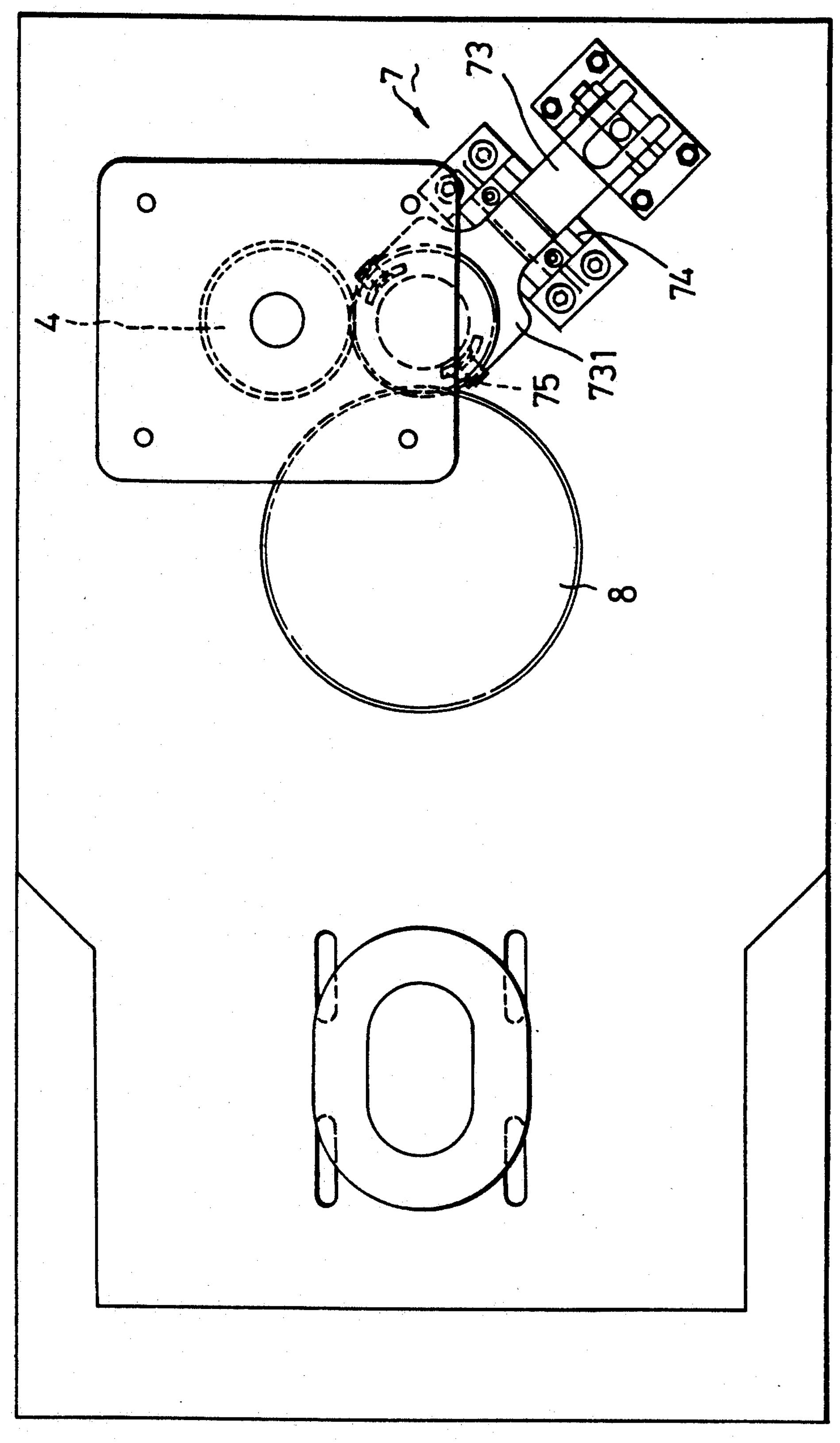
FIG. 5 shows a top plane view of the preferred embodiment, illustrating the relevant arrangement of the gears and the gear moving means.
Figure 6:
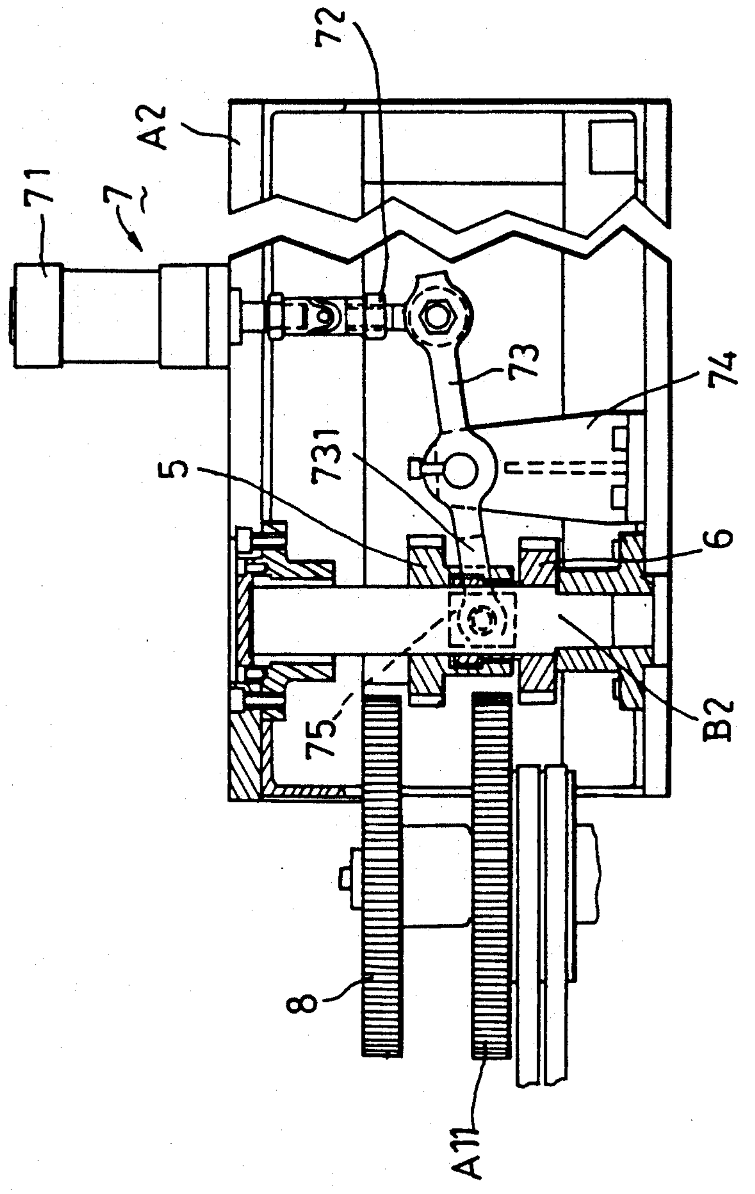
FIG. 6 is a sectional side view of the gear moving means used in the preferred embodiment of the present invention.

The synchronizing mechanism further comprises means (7) for moving axially the third (5) and the fourth gears (5, 6) together along the synchronizing shaft (B2) to engage them with or disengage them from the first gear (8) and the second gear (A11) respectively. The arrangement and relevant positions of the gears and the gear-moving means (7) are best shown in FIG. 6. Referring to FIGS. 5 and 6, this gear-moving means comprises a fulcrum support (74), a lever (73) having a middle portion pivotally mounted at the fulcrum support (74). The lever (73) has a first clamp end (731) preferably provided with a pair of rubber cushion (75), to accommodate and clamp the interengaged engaging members (52, 62) of the 3rd and 4th gears (5, 6). Also, a pneumatic cylinder (71) has a piston rod (72) connected to the other end of the lever (73).

The power source required to drive the gears of the preferred embodiment of the present invention is provided by a driving unit which is operatively connected to the third and fourth gears (5, 6) to rotate the first and second gears (8, A11) via the third and the fourth gears (5, 6). According to this invention, the driving unit comprises a driving pinion (4) engaged with one of the third and fourth gears (in this embodiment, it is engaged with the third gear (5)). The pinion (4) is carried by the output shaft (N1) of the motor (N).

Figure 7:
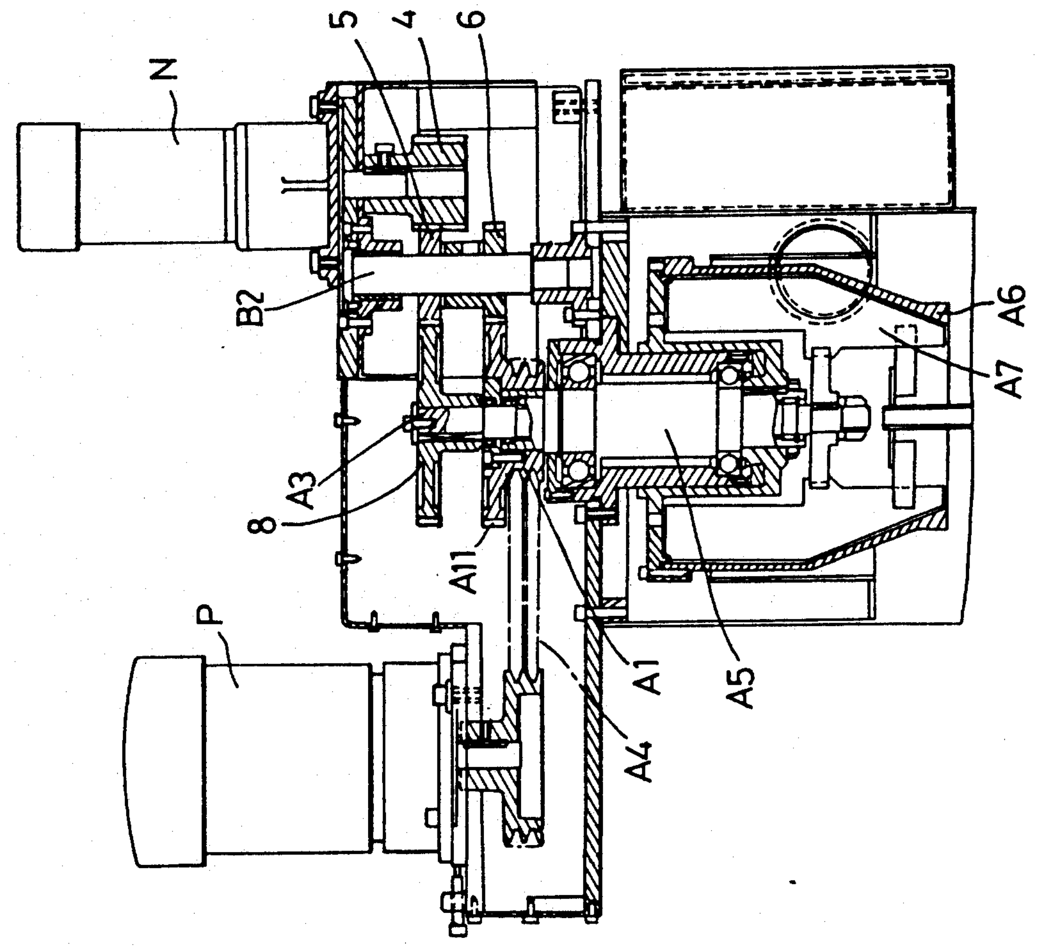
FIG. 7 illustrates how the synchronizing mechanism of the preferred embodiment works to remove the contaminant.

During the oil recovery operation of the preferred embodiment of the invention, the third and fourth gears (5, 6) are at first disengaged from the first and second gears (8, A11) as shown in FIG. 3. The used lubricant is then allowed to enter the tank (A6) through the oil inlet (A8). The turning shaft of the motor (P) drives the belt (A4), the belt wheel (A1) and the hollow shaft (A5) to rotate the tank (A6) and generates a centrifugal effect thereby separating the contaminant from the used lubricant as the conventional method does. However, the present invention additionally provides a power operating system for the removal of the contaminant. Referring to FIGS. 6 and 7, in removing the contaminant deposited on the wall of the tank (A6), the motor (P) is switched off first and then the pneumatic cylinder (71) of the gear-moving means (7) is actuated to drive the piston rod (72) to push down one end of the lever (73) thereby causing the other clamp end (731) of the lever (73) to lift the third and fourth gears (5, 6) together until they engage the first gear (8) and the second gear (A11) as illustrated in FIG. 7. Thereafter, the motor (N) is activated to drive, via the driving pinion (4), the third and thus the fourth gears (5, 6). Because the third and fourth gears (5, 6) are interengaged, they turn at the same rate. Furthermore, since they both engage with the first and second gears (8, A11), the shafts (A3, A5) are rotated at the same time. However, since the numbers of teeth of the first and the third gears (8, 5) are 80 and 41 respectively and those of the second and the fourth gears (A11, 6) are 81 and 40 respectively, the rates of the shafts (A3) and (A5) are not analogous, for example, if the third and the fourth gears (5, 6) run two turns, the first gear (8) will run more than one turn and the second gear (A11) will run less than one turn. The second shaft (A3) and the hollow shaft (A5) are thereby operated at different rates. Since the second shaft (A3) and the hollow shaft (A5) are used to rotate the scraping blades (A7) and the tank (A6) respectively, the scraping blades (A7) and the tank (A6) will have different rotational speeds and as a result, the blades (A7) scrape the contaminant from the inner wall of the tank (A6).

From the above detailed description of the preferred embodiment of the present invention, it should be fully understood that the present invention provides an improved oil recovering apparatus which, instead of using the manual labor to remove the contaminant sludge, employs a synchronizing mechanism to drive the scraping blades and the tank simultaneously at different rates, thereby enabling the scraping blades to scrape the contaminant from the inner wall of the tank and thus obtaining a high performance of removal of contaminant and an economically labor saving.

It will be readily understood that modifications to the preferred embodiment of the apparatus of the invention described above would be obvious to anyone skilled in the art without departing from the scope of the appended claims.

I claim:

1. An apparatus for recovering oil from used lubricant from a machine, which comprises:

a centrifuge unit including a tank for receiving used lubricant, a hollow shaft (A5) connected to said tank and having an upper portion extending outwardly from the top of said tank, and a motor operatively connected to said hollow shaft so as to drive said hollow shaft to rotate said tank;

said tank having an inner peripheral wall for deposition of contaminant from used oil by centrifugal force;

means for scraping contaminant from said inner peripheral wall of said tank including a second shaft (A3) which extends axially through and is mounted to said hollow shaft for relative rotation therebetween;

said second shaft having a lower portion extending downwardly out of said hollow shaft into said tank and having an upper portion extending upwardly out of said hollow shaft;

said contaminant-scraping means further including a plurality of scraping blades extending radially outward from said lower portion of said second shaft for scraping contaminant from said inner peripheral wall of said tank; and a synchronizing mechanism connected to said centrifuge unit and said contaminant-scraping means for driving said hollow shaft and said second shaft simultaneously at different rates, which comprises:

a first gear (8) attached to said upper portion of said second shaft (A3);

a second gear (A11) attached to said upper portion of said hollow shaft (A5);

said first gear and said second gear having a different number of teeth;

a synchronizing shaft (B2) provided adjacent to said first and second gears;

a third gear (5) and a fourth gear (6) mounted on said synchronizing shaft in an axially movable position for engaging with said first and second gears (8, A11) respectively, wherein said third and fourth gears have different numbers of teeth and are spaced at a distance equal to that between said first gear (8) and said second gear (A11);

means (7) for moving axially said third gear (5) and said fourth gear (6) together along said synchronizing shaft (B2) to engage or disengage from said first gear (8) and said second gear (A11) respectively; and a driving unit operatively connected to said third and fourth gears to rotate said first and second gears via said third and said fourth gears.

2. The apparatus as described in claim 1, wherein said third gear (5) and said fourth gear (6) each have a bore for receiving said sychronizing shaft (B2) and have at one side thereof a pair of diametrically opposite engaging members (52, 62) extending axially therefrom; each of said engaging members (52, 62) being in the shape of a segment of a cylinder and having a neck part (521, 621) and an enlarged end (522, 622) extending axially outward from said neck part, said third gear and fourth gear being interengaged by fitting said enlarged ends of said engaging members of one said third and fourth gears respectively into the space between said neck parts of said engaging members of the other one of said third and fourth gears, said engaging members of said third and fourth gears complementing each other to form a cylinder.

3. The apparatus as described in claim 2, wherein said gear-moving means comprises:

a fulcrum support;

a lever having a middle portion pivotally mounted at said fulcrum support, a first clamp end to clamp said interengaged engaging members of said third and fourth gears and a second end; and a power cylinder having a piston rod connected to said second end of said lever.

4. The apparatus as described in claim 3, wherein said driving unit comprises:

a driving pinion engaged with one of said third and fourth gears;

a driving shaft carrying said driving pinion; and a motor operatively connected to said driving shaft.

5. The apparatus as described in claim 1, wherein said driving unit comprises:

a driving pinion engaged with one of said third and fourth gears;

a driving shaft carrying said driving pinion; and a motor operatively connected to said driving shaft.

* * * * *